United States Patent
Guenebaud

(10) Patent No.: US 7,403,619 B2
(45) Date of Patent: Jul. 22, 2008

(54) INTERFACE MODULE AND DECODER FOR HOST

(75) Inventor: Philippe Guenebaud, St Cyr (FR)

(73) Assignee: SmarDTV SA, Cheseaux-sur-Lausanne (CH)

( * ) Notice: Subject to any disclaimer, the term of this patent is extended or adjusted under 35 U.S.C. 154(b) by 989 days.

(21) Appl. No.: 10/168,305

(22) PCT Filed: Dec. 19, 2000

(86) PCT No.: PCT/FR00/03592

§ 371 (c)(1),
(2), (4) Date: Jun. 20, 2002

(87) PCT Pub. No.: WO01/47267

PCT Pub. Date: Jun. 28, 2001

(65) Prior Publication Data

US 2003/0012377 A1 Jan. 16, 2003

(30) Foreign Application Priority Data

Dec. 22, 1999 (FR) .................................... 99 16314

(51) Int. Cl.
- *H04N 7/167* (2006.01)
- *H04N 5/91* (2006.01)
- *H04L 9/00* (2006.01)
- *H04K 1/00* (2006.01)

(52) U.S. Cl. .................. 380/239; 380/221; 380/47; 705/57; 386/94

(58) Field of Classification Search .............. 380/239, 380/221, 47; 705/57; 385/94
See application file for complete search history.

(56) References Cited

U.S. PATENT DOCUMENTS 5,719,950 A * 2/1998 Osten et al. ................. 382/115

(Continued)

FOREIGN PATENT DOCUMENTS

EP 0562295 9/1993

(Continued)

*Primary Examiner*—Emmanuel L Moise
*Assistant Examiner*—Techane J Gergiso
(74) *Attorney, Agent, or Firm*—Finnegan, Henderson, Farabow, Garrett & Dunner, L.L.P.

(57) ABSTRACT

The present invention relates to an interface module for a host (2) such as a digital television decoder, permitting the processing of information coming from the host (2) in a conditioned manner subject to a conditional access system (11), comprising authorization means (7) by which the user justifies his access rights.

The module has
- at least one means (8) for identifying the authorization means (7);
- means (10) for storing a plurality of conditional access systems (11),
- processing means (9) adapted to process the information coming from the host (2) utilizing the conditional access system (11) corresponding to the authorization means (7) identified by the identification means (8), permitting to exploit a plurality of conditional access systems (11) within the same module The invention also relates to a decoder and a method adapted to be performed by the interface module For use in digital television decoders

12 Claims, 1 Drawing Sheet

U.S. PATENT DOCUMENTS

| | | | | |
|---|---|---|---|---|
| 5,796,829 A * | 8/1998 | Newby et al. | | 705/54 |
| 6,009,116 A * | 12/1999 | Bednarek et al. | | 375/130 |
| 6,035,038 A * | 3/2000 | Campinos et al. | | 380/228 |
| 6,040,851 A * | 3/2000 | Cheng et al. | | 725/132 |
| 6,069,647 A * | 5/2000 | Sullivan et al. | | 725/29 |
| 6,108,422 A * | 8/2000 | Newby et al. | | 380/47 |
| 6,381,747 B1 * | 4/2002 | Wonfor et al. | | 725/104 |
| 6,424,714 B1 * | 7/2002 | Wasilewski et al. | | 380/200 |
| 6,424,717 B1 * | 7/2002 | Pinder et al. | | 380/239 |
| 6,516,465 B1 * | 2/2003 | Paskins | | 725/25 |
| 6,543,050 B1 * | 4/2003 | Letellier et al. | | 725/31 |
| 6,628,891 B1 * | 9/2003 | Vantalon et al. | | 386/94 |
| 6,637,027 B1 * | 10/2003 | Breslauer et al. | | 725/25 |
| 6,738,905 B1 * | 5/2004 | Kravitz et al. | | 713/194 |
| 6,745,245 B1 * | 6/2004 | Carpenter | | 709/229 |
| 6,772,434 B1 * | 8/2004 | Godwin | | 725/68 |
| 7,023,992 B1 * | 4/2006 | Kubota et al. | | 380/210 |
| 7,039,614 B1 * | 5/2006 | Candelore | | 705/57 |
| 7,039,802 B1 * | 5/2006 | Eskicioglu et al. | | 713/156 |

FOREIGN PATENT DOCUMENTS

| | | | |
|---|---|---|---|
| EP | 696141 A2 * | 2/1996 | |
| EP | 884906 A1 * | 12/1998 | |
| WO | WO97/18656 | 5/1997 | |

* cited by examiner

INTERFACE MODULE AND DECODER FOR HOST

BACKGROUND OF THE INVENTION

The present invention relates to an interface module for a host such as a digital television decoder, permitting to process information from the host in a manner subject to a conditional access system comprising authorizing means whereby a user justifies his access rights.

The invention also relates to a decoder integrating such module.

The invention finally relates to a method of processing information from a host capable of being used in the interface module.

The invention is particularly suitable for application in decoders for the reception of digital television programs. The host considered here, however, may also be constituted by other types of decoders, or even, for example, by a computer.

With the development of digital television, the use of decoders capable of receiving signals corresponding to television programs and of transmitting them to a television set after processing into an intelligible format, has become wide spread.

Authorization means comprising chip cards, for example, whereby the user justifies his access rights to programs, are often used.

If the user is recognized and if his rights are identified, processing of the television program signals occurs within the decoder. Currently, specific conditional access systems are used for such processing. From a practical point of view, this is software supplied by the digital television operator and permitting decoding of the signals sent or transmitted from a server to the user.

Initially, distinct decoders for each operator have been proposed, each comprising its own conditional access system.

To satisfy the user holding subscriptions with different operators, decoders comprising a plurality of conditional access systems have been provided. For each conditional access system, a distinct module is necessary in this case, each for cooperation with a specific chip card of the user.

To illustrate the state of the art thus exposed, EP-A-0562295 discloses an apparatus wherein a plurality of card readers are connected to and controlled by a single processor A particular supply unit which is controlled by the processor, feeds the card readers with appropriate voltages.

Document WO-A-97/18656 discloses a system and method permitting to select one of a plurality of signals transmitted by direct television broadcast satellites A conversion box, or decryption device, is equipped with a plurality of different decryption chip cards, which are all simultaneously introduced into the conversion box.

Further, from document EP-A-0696141 a system for controlling different conditional access systems is known, such systems transmitting video, audio and data services to receivers adapted for such services, each conditional access system coding the service to be transmitted within the system, the system sending the coded encryption keys necessary in the receiver and sending authorization messages.

The first mentioned document is not a response to the current needs in presence of a multiplication of conditional access systems since it permits use of a single encryption system only.

Although the second document permits the use of a plurality of decryption systems, it multiplies the number of card readers, each reader being associated with a given decryption, not being adaptive. The third document teaches an elimination of chip card modules, which, however, are used in the environment of the invention In addition, it fails to provide any identification means for identifying authorization means of the user (that may include his chip cards).

Consequently, such devices are of limited applicability and fail to permit a convenient manner of use.

SUMMARY

The present invention permits to avoid the drawbacks of the current devices.

In the first place, the invention provides, in a single module, the possibility to use a plurality of conditional access systems. Thereby, a multiplication of the modules, of the chip card readers or even of the decoders is avoided.

Further, the invention simplifies the user's intervention because it permits an automatic identification of his rights.

For example, if the user justifies his rights by means of chip cards (one card per subscription), he must not worry about the chip card reader into which he introduces the card: the card will be recognized with any reader used.

Another object of the invention is to avoid complications in connection with the installation or update of the conditional access systems when the user is desirous to modify his rights (change of operator or subscription, for example). The user already holds a multiplicity of conditional access systems, and when an update is required, it can be made by remote download.

Other objects and advantages will appear from the following description, not limiting the invention.

The present invention relates to an interface module for a host such as a digital television decoder, permitting the processing of information from the host subject to a conditional access system comprising authorizing means whereby the user justifies his access rights, characterized by the fact that it further comprises at least one means for identifying the authorization means;

means for storing a plurality of conditional access systems, processing means capable of processing the information from the host using the conditional access system corresponding to the authorization means identified by the identification means, permitting exploitation of a plurality of conditional access systems in the same module.

Such interface module can be present in the following embodiments:

the authorization means comprise at least one chip card reader whereon data relating to the access rights of the user are stored;

the conditional access systems are constituted by programmed instruction sets that can be executed by the processing means for the processing of the information;

the storing means are formed by a non-volatile memory;

the processing of information is a decoding;

the authorization means comprise at least one reader of biometric data the identity of which corresponds to the access rights of the user.

The invention also relates to a digital television signal decoder integrating at least one interface module.

Finally, the invention relates to a method of processing information from a host in a manner subject to a conditional access system, capable of being used by the interface module, wherein authorization means are used whereby the user justifies his access rights, characterized by the fact that:

a plurality of conditional access systems are stored, the authorization means are identified;

the information from the host are processed using the conditional access system corresponding to the identified authorization means.

Such method may comprise the following variants:

as a conditional access system, programmed instruction sets are used that may be executed for the processing of the information, one or a plurality of conditional access systems are stored by remote download from a server center.

BRIEF DESCRIPTION OF THE DRAWINGS

The appending drawings are given by way of examples without limitation. The drawings show a preferred embodiment of the invention. They permit an easy understanding of the invention.

DETAILED DESCRIPTION

First, the inventive interface module will be disclosed. Such module is shown in FIG. 1 at reference number 1.

The interface module 1 is connected to or integrated into its host 2 Host 2 could be a digital television decoder, although the example is not limitative.

Generally speaking, the interface module 1 allows the processing of information coming from host 2 in a conditioned manner subject to a conditional access system 11.

Figure 1:
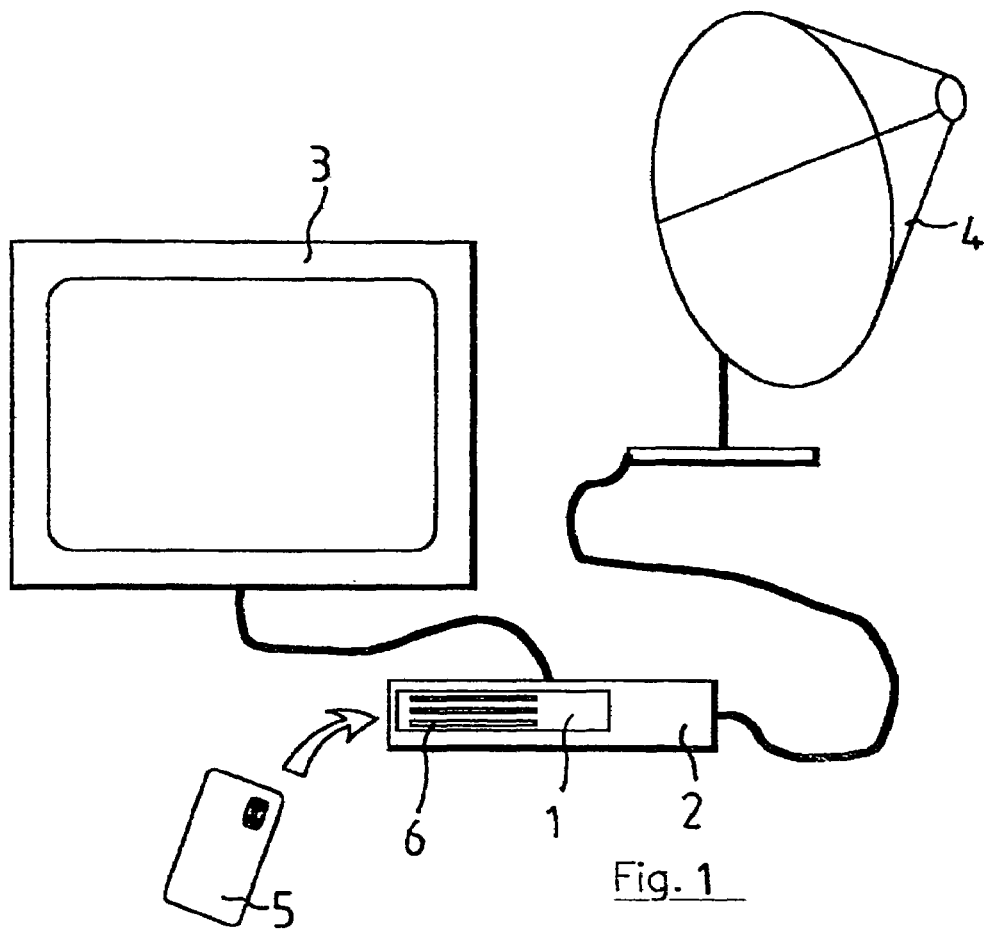
FIG. 1 is an illustration of an installation for the reception of digital television programs.

As illustrated in FIG. 1, in an exemplary digital television application, the interface module 1 is integrated into a decoder constituting host 2. Host 2 is in turn connected to a television set 3 adapted to display the user's programs. Host 2 is further connected to an antenna for the reception of signals corresponding to the subscriber's digital television programs.

As also illustrated in FIG. 1, the user can justify his access rights for the programs through authorization means. In the case of FIG. 1, the authorization means 7 are formed by a chip card 5 cooperating with a chip card reader 6 integrated into the interface module 1. Another case is the use of biometric data read by an appropriate reader.

As understood here, authorization means 7 are the combination or association of one or more data carriers adapted to justify the access rights of the user and one or more readers for the carrier or carriers. The readers are adapted to forward the information corresponding to the access rights to other means constituting the interface module 1.

Besides the association of chip cards 5 and chip card readers 6, the authorization means could be constituted in different manners and, in particular, as digital finger print readers or as a keyboard for entering a confidential code.

The conditional access systems 11 that can be used in accordance with the invention, could be constituted by the current systems known in the art. In most cases, they are software that can be executed if the access rights of the user are acknowledged The different conditional access systems are thus constituted by programmed instruction sets that can be executed within the interface module 1.

In accordance with the invention, the interface module 1 has at least one means 8 for identifying the authorization means 7.

The function of these identification means 8 is to recognize the identity of the user's rights or, possibly, to reject authorization for access to digital television programs if the identification is negative.

The identification means 8 can be constituted by software via programs. They can further be constituted in a more material manner by electronic processing.

Current concepts can be used which presently exist, to provide identification means 8 adapted to recognize or identify the different authorization means 7.

The interface module 1 further comprises means 10 for storing a plurality of conditional access systems 11.

Generally, the storing means 10 can be constituted by a storage unit such as a non-volatile memory Use of a volatile memory is not excluded, however, in particular when a download mechanism for conditional access systems 11 is used.

The storing means 10 allow to store a plurality of conditional access systems 11. The number thereof is not limited, thereby providing the user with an interface module 1 which is developed according to the subscriber's desire.

The interface module further comprises processing means 9 adapted to process information coming from the host 2.

The processing means 9 preferably include a processor for executing the conditional access systems 11.

In the invention, the processing means process information coming from host 2 by using a particular conditional access system. It will be the conditional access system 11 that corresponds to the authorization means 7 identified by the identification means 8.

Thus, the processing means 9 are an active component adapted to:

comprise information received by the identification means 8.

consequently utilizing a conditional access system 11 perform a dialogue with host 2 according to its parameters.

In this way, the processing means automatically exploit the conditional access system 11 contained in the storing means 10 and corresponding to the authorization means 7 of the user.

In a preferred embodiment, processing of information as effected by the processing means 9, is a decoding action.

Figure 2:
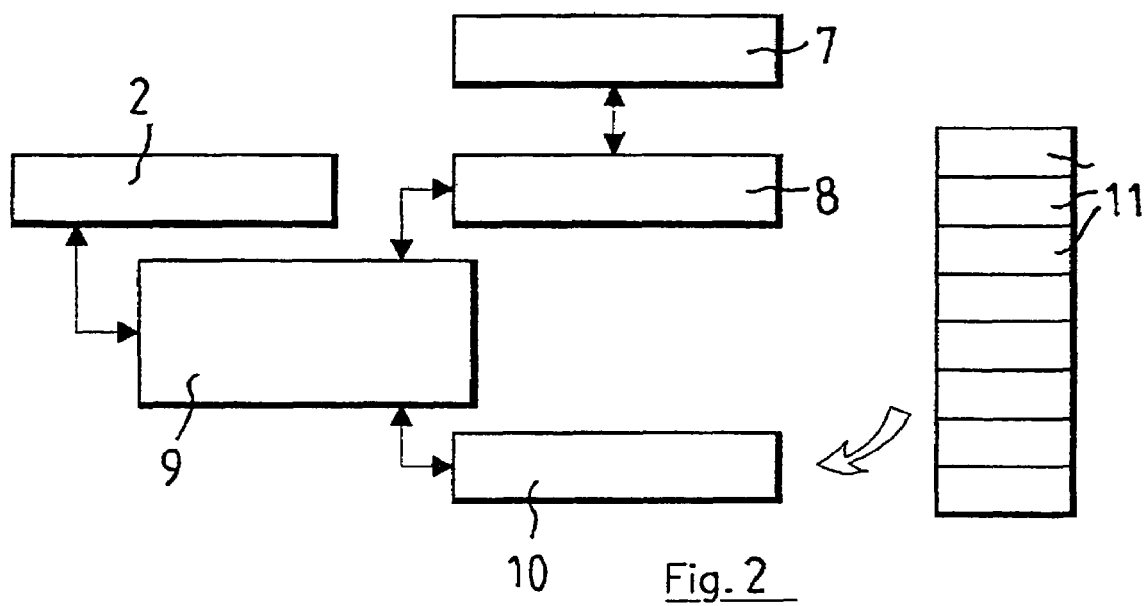
FIG. 2 is a diagram of the means constituting the module of the invention in a particular embodiment thereof.

With reference to FIG. 2, operation of the interface module presented here is easily understood.

In a first time, an information is transmitted from the authorization means 7 to the identification means 8. In the example where the authorization means 7 are formed by chip cards 5 and chip card readers 6, such transfer of information occurs when the user inserts the chip card 5 into the chip card reader 6

When the authorization means 7 are not identified, the user is disabled from operating the interface module 1

If they are identified, the identification means 8 recognize the identity of the access rights and transmit a corresponding usable information to the processing means 9

In accordance with the information received, the processing means 9 will use a specific conditional access system 11 stored in the storing means 10

Using the conditional access system corresponding to the rights of the user, the interface module 1 will process the information received from host 2.

After processing, this information can be used by the entire device, for example by the association of the decoder and the television set in the environment of digital television.

When the user holds a plurality of chip cards 5 or other authorization means 7, he will be enabled to access those programs for which he has access rights without worrying about the chip card reader 6 into which he inserts the chip card, and without worrying about any other selection.

In accordance with the invention, the interface module presented here could be integrated into a digital television signal decoder. Further, such a decoder could comprise a plurality of interface modules 1, if required.

The invention also relates to a method of processing information from a host 2 adapted to be executed by the interface module 1 described above.

Such method effects conditioned processing subject to a conditional access system 11.

In accordance with the method, authorization means 7 are used whereby the user justifies his access rights.

The method further comprises the following steps.

In a first time, a plurality of conditional access systems 11 are stored.

The authorization means 7 which the user uses, are then identified.

If the identification is positive, the information from the host 2 are processed using the conditional access system 11 corresponding to the authorization means 7 as identified.

In a preferred embodiment, programmed instruction sets that can be executed to process the information, are used as the conditional access system 11.

Many conditional access systems 11 can be stored. If some have to be added or updated, such operation can be performed by downloading from a server center available to the digital television operator (or another service).

The invention has been described above with reference to a digital television application without, however, being limited to such application.

In this application, the entire method could run via a standard interface of the CI type (common interface) for the DVB standard (Digital Video Broadcasting) or of the type EIA-677 (Electronic Industries Alliance) for the POD standard (Point of Development).

According to the DVB and POD standards, the scramblings at the transport level or at the level of the elementary packet flow, are recognized by the processing means 9, and descrambling is performed automatically.

A plurality of conditional accesses could thus be used (embedded or downloaded) without manual intervention independent of the nature of the conditional access.

REFERENCE NUMERALS 1 1. interface module 2 host 3 television set 4 antenna 5. chip card 6. chip card reader 7. authorization means 8. identification means 9. processing means 10. storing means 11. conditional access systems

The invention claimed is:

1. An interface module comprising:
a host to allow for the processing of information in a manner subject to a conditional access system pertaining to an operator comprising a set of programmed instructions;
a plurality of conditional access systems stored within the interface module, each conditional access system being associated with a different one of a plurality of operators;
authorization means whereby a user justifies his right to access at least one of the conditional access systems;
at least one means for identifying the authorization means;
means for selecting and enabling the conditional access system corresponding to the identified authorization means; and
process the processing means for processing information from the host utilizing the conditional access system corresponding to the authorization means identified by the identification means.

2. Interface module in accordance with claim 1, wherein the authorization means comprises a chip card whereon a data relating to the access rights of the user is stored.

3. Interface module according to claim 2, wherein a storing means is formed on the chip card by a non-volatile memory.

4. Interface module according to claim 1, wherein the processing of information is a decoding operation.

5. Interface module according to claim 1, wherein the authorization means comprise at least one biometric identity smart card reader.

6. Interface module according to claim 1, wherein a means for storing the plurality of conditional access systems stores the plurality of conditional access systems in a location separate from the authorization means.

7. Digital television signal decoder comprising:
at least one interface module to allow for the processing of digital television signals in a manner subject to a conditional access system pertaining to an operator, comprising a set of programmed instructions, wherein said interface module comprises:
a plurality of conditional access systems stored within the interface module, each conditional access system being associated with a different one of a plurality of operators;
authorization means whereby a user justifies his right to access at least one of the conditional access systems;
at least one means for identifying the authorization means;
means for selecting and enabling the conditional access system corresponding to the identified authorization means; and
processing means for processing information from the decoder utilizing a conditional access system corresponding to the authorization means identified by the identification means.

8. The digital television signal decoder according to claim 7, wherein the means for storing the plurality of conditional access systems stores the plurality of conditional systems in a location separate from the authorization means.

9. The digital television signal decoder according to claim 7, wherein the authorization means comprises a chip card whereupon the data relating to the access rights of the user is stored.

10. The digital television signal decoder according to claim 7, wherein the storing means is formed by non-volatile memory.

11. Method of processing information coming from a host, said method comprising:
prepared preparing information to be used in a conditional access system pertaining to an operator, comprising a set of programmed instructions in an interface module comprising an authorization means allowing a user to justify his right to access said information;
storing a plurality of conditional access systems within the interface module, wherein each conditional access system is associated with a different one of a plurality of operators;
identifying the authorization means;
justifying the user's right of access to at least one of the plurality of conditional access systems;
selecting and enabling the conditional system corresponding to the identified authorization means; and
processing the information from the host using the conditional access system corresponding to the identified authorization means.

12. The method according to claim 11, wherein at least one out of the plurality of conditional access systems is stored through downloading from a server center.

* * * * *